US009556317B2

(12) United States Patent
Kimura et al.

(10) Patent No.: US 9,556,317 B2
(45) Date of Patent: Jan. 31, 2017

(54) MOLDING SHEET FOR FORMING HARD COAT LAYER

(75) Inventors: Nobuo Kimura, Chiba (JP); Hiromoto Shibata, Chiba (JP); Kazuki Hasegawa, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 1127 days.

(21) Appl. No.: 12/665,607

(22) PCT Filed: Jul. 3, 2008

(86) PCT No.: PCT/JP2008/001776
§ 371 (c)(1),
(2), (4) Date: Dec. 18, 2009

(87) PCT Pub. No.: WO2009/004821
PCT Pub. Date: Jan. 8, 2009

(65) Prior Publication Data
US 2010/0200157 A1   Aug. 12, 2010

(30) Foreign Application Priority Data

Jul. 3, 2007  (JP) ................. 2007-175036
Sep. 3, 2007  (JP) ................. 2007-228353
Nov. 1, 2007  (JP) ................. 2007-285225

(51) Int. Cl.
*B32B 27/26*  (2006.01)
*C08J 7/04*  (2006.01)
*B29C 45/14*  (2006.01)
*G02B 1/10*  (2015.01)

(52) U.S. Cl.
CPC .......... *C08J 7/047* (2013.01); *B29C 45/14827* (2013.01); *C08J 2483/00* (2013.01); *G02B 1/105* (2013.01)

(58) Field of Classification Search
None
See application file for complete search history.

(56) References Cited

U.S. PATENT DOCUMENTS

| 3,451,838 A * | 6/1969 | Burzynski ............... C08J 7/047 427/108 |
| 4,455,205 A * | 6/1984 | Olson et al. .................... 522/44 |
| 5,021,091 A * | 6/1991 | Takarada et al. ........ 106/287.16 |
| 5,902,654 A * | 5/1999 | Yamaki et al. ............... 524/506 |
| 5,945,172 A * | 8/1999 | Yamaya et al. ............... 427/503 |
| 2004/0028910 A1* | 2/2004 | Yamamoto et al. .......... 428/421 |
| 2006/0221451 A1 | 10/2006 | Ohishi et al. |
| 2007/0104896 A1 | 5/2007 | Matsunaga et al. |
| 2007/0178298 A1 | 8/2007 | Suzuki et al. |
| 2009/0025610 A1* | 1/2009 | Kimura et al. ........ 106/287.14 |

FOREIGN PATENT DOCUMENTS

| CN | 1975466 | 6/2007 |
| EP | 0 379 343 | 7/1990 |
| EP | 1 849 835 | 10/2007 |
| EP | 2 090 600 | 8/2009 |
| JP | 2001-214092 | 8/2001 |
| JP | 2004-001350 | 1/2004 |
| JP | 2005-206778 | 8/2005 |
| JP | 2006-150949 | 6/2006 |
| JP | 2007-182511 | 7/2007 |
| JP | 2008-19358 | 1/2008 |
| JP | 2008-165041 | 7/2008 |
| WO | WO 2006088079 A1 * | 8/2006 ........... C09D 183/04 |
| WO | WO 2008/069217 | 6/2008 |

OTHER PUBLICATIONS

H. L. Vincent et al., "Polysiloxane-Silica Hybrid Resins as Abrasion-Resistant Coatings for Plastic Substrates", Dow Corning Corporation, 1985, American Chemical Society, pp. 129-134.*
Istvan Benedek and Luc J. Heymans, "Pressure-Sensitive Adhesives Technology", Marcel Dekker, Inc., 1997, Chapter 8, pp. 440-442.*
Brochure of "Trimethoxymethylsilane" from Sigma-Aldrich, retrived on Sep. 9, 2013.*
Brochure of "gamma-Acryloxypropyltrimethoxysilane", from SiSiB Silanes Power Chemical Corporation, retrived on Sep. 9, 2013.*
Noriyoshi, Saito et al., "Coating Composition", English translation of JP 61043665, Mar. 3, 1986.*
Product data sheet "Triethoxyphenylsilane" from Sigma-Aldrich, Aug. 25, 2015.*
Product data sheet "Triethoxymethylsilane" from Sigma-Aldrich, Aug. 25, 2015.*
Japanese Patent Office, International Preliminary Report on Patentability (translated) mailed Jan. 26, 2010, from related International Patent Application No. PCT/JP2008/001776.
Search Report, European Patent Application No. 08 77 6788, mailed Sep. 1, 2010.
Japanese Patent Office, International Search Report (translated) mailed Aug. 12, 2008, from related International Patent Application No. PCT/JP2008/001776.
EP Communication with a European Search Report issued in EP Appln. No. 13196388.6, dated Apr. 14, 2014, 9 pages.
JSI-K5600-5-1, "Testing Methods for Paints-Part 5: Mechanical Property of Film-", Section 1: Bend Test (cylindrical mandrel), 2013, pp. 272-277 (with partial EN translation).

* cited by examiner

*Primary Examiner* — Anish Desai
(74) *Attorney, Agent, or Firm* — Kenyon & Kenyon LLP

(57) ABSTRACT

The object of the present invention is to provide a molding sheet for forming a hard coat layer having an excellent shelf life or tracking ability to the mold in a semi-cured state, and having an excellent abrasion resistance after being cured completely, a molded body having a hard coat layer, and a method for manufacturing the same. The present invention relates to a molding sheet for forming a hard coat layer, comprising a layer consisted of a semi-cured material of a composition comprising:

a) an organosilicon compound, b) a ultraviolet ray curable-compound, and c) a silanol condensation catalyst on the substrate, and to a molded body using the same.

7 Claims, No Drawings

MOLDING SHEET FOR FORMING HARD COAT LAYER

This application is a national phase application of PCT/JP2008/001776 filed on Jul. 3, 2008 which claims priority under 35 U.S.C. 119 to Japanese Patent Application Nos. 2007-175036 filed Jul. 3, 2007; 2007-228353 filed Sep. 3, 2007; and 2007-174114 filed Nov. 1, 2007.

TECHNICAL FIELD

The present invention relates to a molding sheet for forming a completely cured hard coat layer on a molded body comprising forming a sheet having a hard coat precursor layer in a semi-cured state, and then curing completely by irradiating active energy ray.

Further, the present invention relates to a composition for forming a hard coat layer to be used for the molding sheet for forming a hard coat layer, and a molded product using the same.

BACKGROUND ART

Conventionally, a hard coat is widely provided to a desired site such as a surface of a molded body made from resin, in order to confer abrasion resistance to a surface of various products similar to that of a glass surface.

One of methods for forming such hard coat, is a method for transferring a hard coat layer.

This is a method comprising using a so-called transfer foil, and there is an advantage that by using a transfer foil comprising a hard coat layer on the substrate, a hard coat with a uniform film thickness can be formed with a relatively simple process to a desired site of various substances. However, there is a problem for a hard coat transfer foil, that when the hardness of the hard coat layer is very high, cracks are generated to the hard coat layer when wrapped in a roll state. There is a transfer foil for hard coat by two-step curing, comprising wrapping around a hard coat layer in a roll state when it is in a semi-cured state, transferring the layer to the adherend, and performing further curing to complete a final hard coat on the adherend (Patent Document 1).

As an alternative method, there is a method comprising coating and drying a resin solution to be a hard coat layer in a later step, to a surface of a thermoplastic resin sheet that has been adjusted to a certain size, to provide a semi-cured resin layer, and subjecting the thermoplastic resin sheet to heat molding such as vacuum molding (Patent Documents 2, 3). The semi-cured resin layer has a hardness of a level that there is no difficulty for handling, and changes its shape by sufficiently following the prescribed shape of molding. A hard coat covering the surface of the molded product is made by completely curing the semi-cured resin layer after semi-curing and molding.

Each of these methods uses a sheet (foil) having a hard coat precursor layer in a semi-cured state on the substrate. However, these sheets had also drawbacks in that it cannot be stored for a long period in a semi-cured state as the semi-cured state is not stable, and that it was necessary to put a release resin film or the like between the sheets in order to avoid adhesion (blocking) of the sheets, when wrapping a long sheet in a roll state.

On the other hand, it is known to use acrylate series resin and the like as UV curable resin for a hard coat film. For example, Patent Document 3 describes a hard coat film comprising meth(acrylic)ester mixture (A), photopolymerization initiator (B), ethylene unsaturated group-containing urethane origomer (C), colloidal silica sol (D), and diluent (E), and that the obtained film has a good pencil hardness, curl and adherence to the substrate.

Moreover, Patent Document 4 describes to use a curable composition comprising (A) a particle made by binding an oxide particle of at least one element selected from the group consisting of silicon, aluminum, zirconium, titanium, zinc, germanium, indium, tin, antimony and cerium, and an organic compound comprising a polymerizable unsaturated group; (B) a compound having a urethane bound and 2 or more polymerizable unsaturated groups in the molecule; and (C) a curable composition comprising a photopolymerization initiator, and describes that a film (layer) having an excellent coating ability, can be formed on the surface of various substrates with a high hardness and high refractive index as well as an excellent abrasion resistance and an excellent adherence between the substrate and layer with low refractive index.

Further, Patent Document 5 describes an ultraviolet ray curable-hard coat resin composition made by compounding (A) a mixture of a hydrolysate of an organosilicon compound and fine particles of a metal oxide, (B) multifunctional acrylate or methacrylate, and (C) a photopolymerization initiator, which bleed to the surface of antistatic agent, decrease of transparency, degradation of humidity resistance and the like can be set within a substantially acceptable range, and can satisfy the functions as a hard coat (abrasion resistance, surface hardness, humidity resistance, resistance to solvents and chemicals, etc.).

However, as hard coat films using these acrylate series resins are inferior to inorganic films in the point of wear resistance, they are improved by adding metal oxide sols. Thus, while the hardness was improved, they had drawbacks in the decrease of transparency and flexibility.

Against this problem, the present inventors had found out that a thin film comprising a polysiloxane composition and an ultraviolet ray curable compound had a significantly high hardness as the surface is mineralized, and thus excellent in abrasion resistance, and also had an excellent adhesion with the adherend (Patent Document 6).

Patent Document 1: Japanese Laid-Open Patent Application No. 2005-206778
Patent Document 2: Japanese Laid-Open Patent Application No. 2004-1350
Patent Document 3: Japanese Laid-Open Patent Application No. 2006-150949
Patent Document 4: Japanese Laid-Open Patent Application No. 2005-272702
Patent Document 5: Japanese Laid-Open Patent Application No. 2001-214092
Patent Document 6: WO2008/069217

DISCLOSURE OF THE INVENTION

Object to be Solved by the Present Invention

The object of the present invention is to provide a molding sheet for forming a hard coat layer which is superior for storage stability before use, and having an excellent abrasion resistance.

Means to Solve the Object

The present inventors made a keen study to solve the above objects, and found out that by applying an organic-inorganic complex comprising a polysiloxane composition, ultraviolet ray-curable compound and a photosensitive compound which themselves have invented previously (Patent Document 6) to a molding sheet, a hard coat having a significantly high hardness as the surface is mineralized, and thus having an excellent abrasion resistance, and also having an excellent adhesion with the adherend. Further, they have found out that even not comprising a photosensitive compound, it is an excellent molding sheet for forming a hard coat layer. The present invention has been thus completed.

Specifically, the present invention relates to:

[1] a molding sheet for forming a hard coat layer comprising a layer (hereinafter referred to as hard coat precursor layer) consisting of a semi-cured material of a composition comprising
a) an organosilicon compound represented by formula (I) and/or its condensate

$$R_nSiX_{4-n} \qquad (I)$$

(wherein R represents an organic group in which a carbon atom is directly bound to Si in the formula, and X represents a hydroxyl group or hydrolysable group; n represents 1 or 2; and when n is 2, R may be the same or different, and when (4−n) is 2 or more, X may be the same or different),
b) a ultraviolet ray curable-compound, and
c) a silanol condensation catalyst,
on a substrate;
[2] the molding sheet for forming a hard coat layer according to [1], wherein the organosilicon compound represented by formula (I) and/or its condensate which carbon number of R is 3 or less is 30 mol % or more with respect to the compound represented by formula (I) and or its condensate;
[3] the molding sheet for forming a hard coat layer according to [1] or [2], wherein the organosilicon compound represented by formula (I) and/or its condensate which carbon number of R is 3 or less is 30 to 95 mol % with respect to the compound represented by formula (I) and/or its condensate, and which carbon number of R is 4 or more is 5 to 70 mol % with respect to the compound represented by formula (I) and or its condensate;
[4] the molding sheet for forming a hard coat layer according to any one of [1] to [3], wherein the ultraviolet ray-curable compound is 80 mass % or less with respect to the total mass of the solid content of the composition.

Further, the present invention relates to
[5] the sheet according to any one of [1] to [4], which is a sheet for in-mold lamination;
[6] the sheet according to any one of [1] to [4], which is a transfer foil;
[7] the transfer foil according to [6], further comprising an adhesion layer;
[8] the transfer foil according to [7], wherein the adhesion layer is formed with an aqueous organic resin as raw material;
[9] the transfer foil according to any one of [6] to [8], wherein the transfer foil is a transfer foil for in-mold molding;
[10] a molded body comprising a hard coat layer formed with a sheet according to any one of [1] to [6].

Further, the present invention relates to
[11] a composition for forming a hard coat layer, comprising
a) an organosilicon compound represented by formula (I) and/or its condensate

$$R_nSiX_{4-n} \qquad (I)$$

(wherein R represents an organic group in which a carbon atom is directly bound to Si in the formula, and X represents a hydroxyl group or hydrolysable group; n represents 1 or 2; and when n is 2, R may be the same or different, and when (4−n) is 2 or more, X may be the same or different),
b) a ultraviolet ray curable-compound, and
c) a silanol condensation catalyst;
[12] the composition for forming a hard coat layer according to [11], wherein the organosilicon compound represented by formula (I) and/or its condensate which carbon number of R is 3 or less is 30 mol % or more with respect to the compound represented by formula (I) and/or its condensate;
[13] the composition for forming a hard coat layer according to [11] or [12], wherein the organosilicon compound represented by formula (I) and/or its condensate which carbon number of R is 3 or less is 30 to 95 mol % with respect to the compound represented by formula (I) and/or its condensate, and which carbon number of R is 4 or more is 5 to 70 mol % with respect to the compound represented by formula (I) and or its condensate;
[14] the composition for forming a hard coat layer according to any one of [11] to [13], wherein the ultraviolet ray-curable compound is 80 mass % or less with respect to the total mass of the solid content of the composition.

Furthermore, the present invention relates to
[15] a method for forming a hard coat layer comprising the following steps:
(A) a step of coating a composition for forming a hard coat layer according to any one of [11] to [14] on a substrate;
(B) a step of making a transfer foil by semi-curing the coating surface with heat and/or active energy ray;
(C) a step of transferring a hard coat precursor layer by contacting the transfer foil with the adherend; and
(D) a step of curing the transferred hard coat precursor layer by irradiating active energy ray;
[16] a method for forming a hard coat layer comprising the following steps;
(A) a step of coating a composition for forming a hard coat layer according to any one of [11] to [14] on a substrate,
(B) a step of semi-curing the composition for forming a hard coat layer with heat and/or active energy ray;
(C) a step of conferring a desired shape; and
(D) a step of curing completely by irradiating active energy ray.
[17] the method for forming a hard coat layer according to [16], wherein the method of conferring a desired shape is any one of press molding, vacuum molding, vacuum and compressed-air molding, compressed-air molding, mat molding, emboss molding, and in-mold lamination.

BEST MODE FOR CARRYING OUT THE INVENTION

Herein, "active energy ray" means ultraviolet ray, X ray, radioactive ray, ionized radioactive ray and ionizing radioactive ray (α-, β-, γ-ray, neutron ray, electron ray).

Further, "semi-cured" means having no tack properties, and that it is sufficiently cured so that no crack is generated by following the mold when molding. Further, "cured" means a state where it is sufficiently cured to the extent that it does not scar easily with an abrasion by steel wool.

Further, herein, "a molding sheet for forming a hard coat layer" means a sheet having a hard coat layer in a semi-cured state, that forms a hard coat layer when manufacturing a molded body.

1. A Composition for Forming a Hard Coat Layer

The composition for forming a hard coat layer of the present invention comprises a) an organosilicon compound represented by formula (I) and/or its condensate

$$R_nSiX_{4-n} \qquad (I)$$

(wherein R represents an organic group in which a carbon atom is directly bound to Si in the formula, and X represents a hydroxyl group or hydrolysable group; n represents 1 or 2, and when n is 2, R may be the same or different, and when (4−n) is 2 or more, X may be the same or different),
b) a ultraviolet ray curable-compound, and
c) a silanol condensation catalyst.

When the silanol condensation catalyst is a metal catalyst, (a) and (c) are not bound with each other, and one of them may be dispersed in the other, or may be chemically bound with each other. Examples include those having Si—O-M bond (M represents a metal atom in the silanol condensation catalyst), or those made in a mixed state.

a) Organosilicon Compound

In the organosilicon compound represented by formula (I), R and X are as follows, respectively:

R represents an organic group wherein a carbon atom is directly bound to Si in the formula. Examples of such organic groups include a hydrocarbon group that may have a substituent, and a group consisting of a polymer of hydrocarbons that may have a substituent.

As hydrocarbon groups, a hydrocarbon group having 1 to 30 carbons that may have a substituent is preferred, and an alkyl group having 1 to 10 carbons that may have a substituent, an alkenyl group having 2 to 10 carbons or an epoxyalkyl group having 1 to 10 carbons that may have a substituent are more preferred.

Further, an organic group may comprise a silicon atom, and may be a group comprising polymers such as polysiloxan, polyvinylsilan and polyacrylsilan.

Examples of hydrocarbon groups include an alkyl group, alkenyl group, alkynyl group and aryl group.

Herein, examples of alkyl group include methyl, ethyl, propyl, isopropyl, butyl, dibutyl, tributyl, isobutyl, amyl, isoamyl, triamyl, hexyl, cyclohexyl, cyclohexylmethyl, cyclohexylethyl, heptyl, isoheptyl, triheptyl, n-octyl, isooctyl, trioctyl and 2-ethylhexyl. An alkyl group having 1 to 10 carbons is preferred.

Examples of alkenyl group include vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, eicosenyl and tricosenyl, and an alkenyl group having 2 to 10 carbons is preferred.

Examples of substituent in a "hydrocarbon group that may have a substituent" include a halogen atom, alkoxy group, alkenyloxy group, alkenylcarbonyloxy group and epoxy group.

Examples of halogen atom include fluorine, chlorine, bromine and iodine. Examples of alkoxy group include methoxy, ethoxy, n-propoxy, isopropoxy, n-butoxy, isobutoxy, sec-butoxy, tert-butoxy, n-pentoxy, isopentoxy, neopentoxy, 1-methylbutoxy, n-hexyloxy, isohexyloxy and 4-methylpentoxy, and an alkoxy group having 1 to 10 carbons is preferred.

An alkenyloxy group is a group wherein an alkenyl group and alkyl group having a carbon-carbon double bond at one or more sites are bound via an oxygen atom, and examples include vinyloxy, 2-propenyloxy, 3-butenyloxy and 4-pentenyloxy. An alkenyloxy group having 2 to 10 carbons is preferred.

An alkenylcarbonyloxy group is a group wherein an alkenyl group is bound with a carbonyloxy group, and examples include acryloxy, methacryloxy, allylcarbonyloxy and 3-butenylcarbonyloxy group. An alkenylcarbonyloxy group having 2 to 10 carbons is preferred.

Further, examples of hydrocarbon groups having an epoxy group as a substituent include an epoxyethyl, 1,2-epoxypropyl, glycidoxyalkyl group and epoxycyclohexylethyl group.

When it is a group wherein R consists of polymers, examples of polymer of a hydrocarbon that may have a substituent include vinyl polymers copolymerized with the followings:

(meth)acrylic esters such as methyl(meth)acrylate, ethyl (meth)acrylate, butyl(meth)acrylate, (meth)acrylate 2-ethylhexyl and cyclohexyl(meth)acrylate;

acid anhydrides of carboxylic acids such as (meth)acrylic acid, itaconic acid and fumaric acid, and maleic acid anhydrides;

epoxy compounds such as glycidyl(meth)acrylate; amino compounds such as diethylaminoethyl(meth)acrylate and aminoethyl vinyl ether;

amido compounds such as (meth)acrylamide, itaconic diamide, α-ethylacrylamide, crotonamide, fumaric diamide, maleic diamide, N-butoxy methyl(meth)acrylamide;

vinyl compounds selected from acrylonitrile, styrene, α-methylstyrene, vinyl chloride, vinyl acetate, vinyl propionate, and the like.

"n" represents 1 or 2, and n=1 is more preferred. When "n" is 2, each R may be the same or different.

X represents a hydroxyl group or hydrolysable group. When (4−n) in formula (I) is 2 or more, each X may be the same or different. A hydrolysable group means a group that can generate a silanol group by being hydrolyzed, when heated at 25 to 100° C., in the absence of catalyst, and in the copresence of excess water; or a group that can form a siloxane condensate. Specific examples include an alkoxy group, acyloxy group, halogen atom and isocyanate group. An alkoxy group having 1 to 4 carbons or an acyloxy group having 1 to 4 carbons is preferred.

Examples of alkoxy group having 1 to 4 carbons include a methoxy group, ethoxy group, n-propoxy group, isopropoxy group, n-butoxy group, sec-butoxy group and t-butoxy group. Examples of acyloxy group with 1 to 4 carbons include acyloxy groups such as formyloxy, acetyloxy and propanoyloxy.

Specifically, organosilicon compounds include methyltrichlorosilane, methyltrimethoxysilane, methyltriethoxysilane, methyltributoxysilane, ethyltrimethoxysilane, ethyltriisopropoxysilane, ethyltributoxysilane, butyltrimethoxysilane, pentafluorophenyl trimethoxysilane, phenyltrimethoxysilane, nonafluorobutylethyltrimethoxysilane, trifluoromethyltrimethoxysilane, dimethyldiaminosilane, dimethyldichlorosilane, dimethyldiacetoxysilane, dimethyldimethoxysilane, diphenyldimethoxysilane, dibutyldimethoxysilane, trimethylchlorosilane, vinyltrimethoxysilane, 3-(meth)acryloxypropyl trimethoxysilane, γ-glycidoxypropyltrimethoxysilane, 3-(3-methyl-3-oxetanemethoxy)propyltrimethoxysilane, oxacyclohexyltrimethoxysilane, methyltri(meth)acryloxysilane, methyl[2-(meth)acryloxyethoxy]silane, methyl-triglycydiloxysilane and methyltris(3-methyl-3-oxetanemethoxy)silane.

These may be used alone, or by combining 2 or more kinds.

When using organosilicon compounds in combination, preferred examples of combination include the combination of vinyltrimethoxysilane and 3-methacryloxypropyltrimethoxysilane; and the combination of vinyltrimethoxysilane and 3-glycidoxypropyl trimethoxysilane.

These organosilicon compounds may be a condensate. A condensate is, specifically, for example a dimer wherein the above organosilicon compounds have undergone hydrolytic condensation to form a siloxane bond.

Further, preferred examples among the organosilicon compounds represented by formula (I) and/or its condensate are those which carbon number of R is 3 or less are 30 mol % or more with respect to the compound represented by formula (I) and/or its condensate, and more preferably 50 mol % or more. It is preferred that those which carbon number of R is 4 or more are 5 mol % or more with respect to the compound represented by formula (I) and/or its condensate.

Specifically, it is preferred that those which carbon number of R is 3 or less are 30 to 95 mol %, those which carbon number of R is 4 or more are 5 to 70 mol %, and more preferably that those which carbon number of R is 3 or less are 50 to 95 mol %, and those which carbon number of R is 4 or more are 5 to 50 mol %.

b) Ultraviolet Ray-Curable Compounds

The ultraviolet ray-curable compound of the present invention relates to a compound polymerizing by irradiation of active energy ray. Particularly, it relates to a compound or resin having a functional group that causes a polymerization reaction by irradiation of ultraviolet ray in the presence of photopolymerization initiator, and examples include (meth)acrylate compounds, epoxy resin, and vinyl compounds excluding acrylate compounds. The number of functional group is not limited as long as it is 1 or more.

Examples of acrylate compounds include polyurethane (meth)acrylate, polyester (meth)acrylate, epoxy (meth)acrylate, polyamido(meth)acrylate, polybutadiene (meth)acrylate, polystyryl(meth)acrylate, polycarbonate diacrylate, tripropylene glycol di(meth)acrylate, hexane dioldi(meth)acrylate, trimethylol propane tri(meth)acrylate, pentaerythritol tri(meth)acrylate, and siloxane polymers having a (meth)acryloyloxy group. Polyester(meth)acrylate, polyurethane(meth)acrylate and epoxypoly(meth)acrylate are preferred, and polyurethane (meth)acrylate is more preferred.

The molecular weight is not limited as long as it has compatibility with other hard coat layer compositions. Generally, a mass-average molecular weight is 500 to 50,000, and preferably 1000 to 10,000.

An epoxy(meth)acrylate can be obtained for example from an esterification reaction of a oxirane ring of a low molecular bisphenol-type epoxy resin or novolac epoxy resin and acrylic acid.

Polyester(meth)acrylate can be obtained for example by esterifying with acrylic acid a hydroxyl group of polyester oligomer having a hydroxyl group at both ends which is obtained by a condensation of multivalent carboxylic acid and multivalent alcohol. Alternatively, it can be obtained by esterifying with acrylic acid a hydroxyl group at the end of an oligomer obtained by adding alkyleneoxide to a multivalent carboxylic acid.

Urethane(meth)acrylate is a reaction product of an isocyanate compound obtained by reacting polyol and diisocyanate, and an acrylate monomer having a hydroxyl group. Examples of polyol include polyester polyol, polyether polyol and polycarbonate diol.

Commercialized products of urethane(meth)acrylate used in the present invention include the followings:

Arakawa Chemical Industries, Ltd.; Product Name: BEAM SET102, 502H, 505A-6, 510, 550B, 551B, 575, 575CB, EM-90, EM92;
San Nopco Limited; Product Name: Photomer 6008, 6210;
Shin-Nakamura Chemical Co., Ltd. Product Name: NK oligo U-2PPA, U-4HA, U-6HA, H-15HA, UA-32PA, U-324A, U-4H, U-6H;
Toagosei Co., Ltd.; Product Name: Alonix M-1100, M-1200, M-1210, M-1310, M-1600, M-1960;
Kyoeisha Chemical Co., Ltd.; Product Name: AH-600, AT606, UA-306H;
Nippon Kayaku Co., Ltd.; Product Name: KAYARAD UX-2201, UX-2301, UX-3204, UX-3301, UX-4101, UX-6101, UX-7101;
The Nippon Synthetic Chemical Industry Co., Ltd.; Product Name: Ultraviolet UV-17008, UV-3000B, UV-6100B, UV-6300B, UV-7000, UV-7600B, UV-2010B, UV-7610B, UV-7630B, UV-7550B;
Negami Chemical Industrial Co., Ltd.; Product Name: ART RESIN UN-1255, UN-5200, HDP-4T, HMP-2, UN-901T, UN-3320HA, UN-3320HB, UN-3320HC, UN-3320HS, H-61, HDP-M20;
Daicel UCB Company Ltd.; Product Name: Ebecryl 6700, 204, 205, 220, 254, 1259, 1290K, 1748, 2002, 2220, 4833, 4842, 4866, 5129, 6602, 8301;
Daicel-Cytec Company Ltd.; Product Name: ACA200M, ACAZ230AA, ACAZ250, ACAZ300, ACAZ320.

Further, examples of vinyl compounds excluding acrylate compounds include N-vinylpyrrolidone, N-vinylcaprolactam, vinyl acetate, styrene and unsaturated polyester. Examples of epoxy resin include
hydrogen added-bisphenol A diglycidyl ether, 3,4-epoxycyclohexylmethyl-3,4-epoxycyclohexane carboxylate,
2-(3,4-epoxycyclohexyl-5,5-Spiro-3,4-epoxy)cyclohexanemetha-dioxane and
bis(3,4-epoxycyclohexylmethyl)adipate.

Examples of photopolymerization initiator include (i) a compound that generates cationic species by light irradiation; and (ii) a compound that generates active radical species by light irradiation.

As a compound that generates cation species by light irradiation, for example, onium salt having a structure shown by the following formula (II) can be suitably exemplified. This onium salt is a compound that releases Lewis acid by receiving light.

$$[R^1{}_aR^2{}_bR^3{}_cR^4{}_dW]^{+e}[ML_{e+f}]^{-e} \quad (II)$$

(In formula (II), cation is an onium ion; W is S, Se, Te, P, As, Sb, Bi, O, I, Br, Cl or N≡N—; $R^1$, $R^2$, $R^3$ and $R^4$ are the same or different organic group; a, b, c and d are each an integer of 0 to 3; and (a+b+c+d) is equal to the valence of W; M is a metal or metalloid constituting the central atom of the halogenated complex $[ML_{e+f}]$, and examples include B, P, As, Sb, Fe, Sn, Bi, Al, Ca, In, Ti, Zn, Sc, V, Cr, Mn and Co. L is for example a halogen atom such as F, Cl and Br. "e" is a net charge of a halogenated complex ion, and "f" is an atomic value of M.)

Specific examples of negative ion $(ML_{e+f})$ in the above formula (II) include tetrafluoroborate $(BF_4^-)$, hexafluorophosphate $(PF_6^-)$ hexafluoroantimonate $(SbF_6^-)$, hexafluoroarcenate $(AsF_6^-)$ and hexachloroantimonate $(SbCl_6^-)$.

Further, an onium salt having a negative ion represented by formula $[ML_f(OH)^-]$ can also be used. Further, it may be an onium salt having other negative ions such as perchlorate $(ClO_4^-)$, trifluoromethane sulfonate ion $(CF_3SO_3^-)$, fluorosulfonate ion $(FSO_3^-)$, toluenesulfonate ion, trinitrobenzene sulfonate negative ion and trinitrotoluene sultanate negative ion. These may be used alone, or by combining 2 or more kinds.

Examples of a compound that generates active radical species by light irradiation include, acetophenone, acetophenone benzyl ketal, 1-hydroxycyclohexyl phenyl ketone, 2,2-dimethoxy-1,2-diphenylethan-1-one, xanthone, fluorenone, benzaldehyde, fluoreine, anthraquinone, triphenylamine, carbazole, 3-methylacetophenone, 4-chlorobenzophenone, 4,4'-dimethoxybenzophenone, 4,4'-diaminobenzophenone, benzoisopropylether, benzoisoethylether, benzyldimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy) phenyl-(2-hydroxy-2-propyl)ketone, 2,4,6-trimethylbenzoyldiphenylphosphine oxide, bis-(2,6-dimethoxybenzoyl)-2,4,4-trimethylpentylphosphine oxide, and oligo(2-hydroxy-2-methyl-1-(4-(1-methylvinyl)phenyl) propanone).

As for the compounding level of the photopolymerization initiator used in the present invention, it is preferred to compound 0.01 to 20 mass % with respect to the solid content of a (meth)acrylate ultraviolet ray curable compound, and more preferably 0.1 to 10 mass %.

In the present invention, a radiosensitizing agent may be added according to need, and for example, trimethylamine, methyldimethanolamine, triethanolamine, p-dimethylaminoacetophenone, p-dimethylamino benzoic acid ethyl, p-dimethylamino benzoic acid isoamyl, N,N-dimethylbenzylamine and 4,4'-bis(diethylamino)benzophenone can be used.

It is preferred that the ultraviolet ray curable compound is 80 mass % or less with respect to the total mass of the solid content of the composition for forming a hard coat layer.

c) Silanol Condensation Catalyst

The silanol condensation catalyst is not particularly limited as long as it hydrolyses a hydrolysable group in the compound represented by formula (I), and condensates silanol to make a siloxane bond. Examples include organic metal, organic acid metal salt, acid, base and metal chelate compound. Silanol condensation catalysts may be used alone, or by combining 2 or more kinds.

Specific examples of organic metals include organic titanium compounds of alkyltitanate etc. including tetraisopropoxy titanium, tetrabutoxy titanium, titanium bis acetyl acetate; and alkoxyaluminums.

Examples of organic acid metal salts include, carboxylic acid metal salts such as zinc octoate, 2-ethylhexanoic acid lead, dibutyltin diacetate, dibutyltin diacetate, tin octanate, zinc naphthenate, ferrous octanate, tin octylate and dibutyltin dicarboxylate, and specifically include carboxylic acid alkali metal salts and carboxylic acid alkali earth metal salts.

Examples of acid include organic acid and mineral acid, and specific examples of organic acid include acetic acid, formic acid, oxalic acid, carbonic acid, phthalic acid, trifluoro acetic acid, p-toluene sulfonic acid and methane sulfonic acids. Mineral acids include hydrochloric acid, nitric acid, boric acid and fluoroboric acid.

Herein, photo-acid-generating agents that generate acid by light irradiation, including diphenyliodonium hexafluorophosphate and triphenylphosphonium hexafluorophosphate are also encompassed.

Examples of bases include strong bases such as tetramethylguanidine and tetramethylguanidylpropyltrimethoxysilane; organic amines, carboxylic acid neutralization salt of organic amine and quaternary ammonium salt.

Examples of metal chelate compounds include aluminum chelates, and specifically include the followings.

Al(acac)₃, Al(O-i-Pr)(acac)₂, Al(O-i-Pr)₂(acac),

Al(O-i-Bu)(acac)₂, Al(O-i-Bu)₂(acac), Al(CH₂COCHC—OEt)₃,

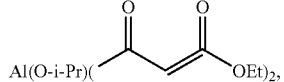

Al(O-i-Pr)(

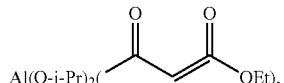

Al(O-i-Pr)₂(

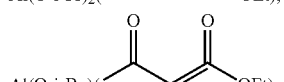

Al(O-i-Bu)(

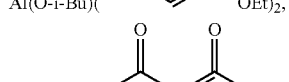

Al(O-i-Bu)₂( (in the formulae, acac denotes an acetylacetonate group, Pr denotes a propyl group, Bu denotes a butyl group, and Et denotes an ethyl group.)

These may be used alone, or by combining 2 or more kinds.

Further, as a silanol condensation catalyst, a photosensitive compound that can remove carbon components on the surface side by the action of a light having a wavelength of 350 nm or less is preferred.

A photosensitive compound is a compound that can remove carbon components on the surface side by the action of a light having a wavelength of 350 nm or less irradiated from the surface side, regardless of the mechanism, and preferably a compound that can make the carbon content on the surface part at 2 nm in the depth direction from the surface to be 80% or less, more preferably 2 to 60%, and further preferably 2 to 40% with respect to the part where the carbon level is not reduced (in case of a film, for example, the back side part at 10 nm in the depth direction from the film back side). Particularly preferably is a compound that can remove carbon components to a certain depth so that the removed amount is gradually decreased from the surface side, specifically a compound that can form a layer wherein the carbon content increases gradually from the surface to a certain depth. For instance, a compound that excites by absorbing a light having a wavelength of 350 nm or less can be exemplified.

Herein, a light having a wavelength of 350 nm or less is a light formed by using a light source comprising a light having any wavelength of 350 nm or less as a component, preferably a light formed by using a light source comprising a light having any wavelength of 350 nm or less as a main component, specifically a light formed by using a light source comprising a light wherein the wavelength having the highest component level is 350 nm or less.

The photosensitive compound comprised in the composition for forming a hard coat layer of the present invention is at least one kind of compound selected from the group consisting of a metal chelate compound, metal organic acid salt compound, metal compound having 2 or more hydroxyl groups or hydrolysable groups, its hydrolysate, and condensates thereof, and preferably a hydrolysate and/or condensate thereof. Particularly, a hydrolysate and/or condensate of a metal chelate compound is preferred. Examples of compounds derived therefrom include those further condensed from a condensate etc. of a metal chelate compound. Such photosensitive compound and/or its derivative may be chemically bound with an organosilicon compound, or dispersed in a non-binding state, or in a mixed state of these, as it is stated in the above.

As for a metal chelate compound, a metal chelate compound having a hydroxyl group or hydrolysable group is preferred, and a metal chelate compound having 2 or more hydroxyl groups or hydrolysable groups is more preferred. Having 2 or more hydroxyl groups or hydrolysable groups means that the total of hydrolysable group and hydroxyl group is 2 or more. Further, as for the metal chelate compounds, β-ketocarbonyl compound, β-ketoester compound and α-hydroxyester compound are preferred. Specifically, compounds wherein β-ketoesters such as methyl acetoacetate, n-propyl acetoacetate, isopropyl acetoacetate, n-butyl acetoacetate, sec-butyl acetoacetate and t-butyl acetoacetate; β-diketones such as acetylacetone, hexane-2,4-dione, heptane-2,4-dione heptane-3,5-dione, octane-2,4-dione, nonane-2,4-dione and 5-methyl-hexane-2,4-dione; or hydroxy carboxylic acids such as glycol acid and lactic acid, are coordinated can be exemplified.

A metal organic acid salt compound is a compound consisting of a metal ion and salt obtained from an organic acid. Examples of organic acid include organic compounds exhibiting acidic property including: carboxylic acids such as acetic acid, oxalic acid, tartaric acid and benzoic acid; sulfur containing organic acids such as sulfonic acid, sulfinic acid and thiophenol; phenol compound; enol compound; oxime compound; imido compound; and aromatic sulfonamide.

Metal compounds having 2 or more hydroxyl groups or hydrolysable groups do not comprise the above metal chelate compounds and metal organic acid salt compounds, and examples include hydroxides of metal and metal alcholate.

Examples of hydrolysable groups in a metal compound, metal chelate compound or metal organic acid salt compound include alkoxy group, acyloxy group, halogen group and isocyanate group, and an alkoxy group having 1 to 4 carbons, and acyloxy group having 1 to 4 carbons are preferred. Meanwhile, having 2 or more hydroxyl groups or hydrolysable groups means that the total of hydrolysable group and hydroxyl group is 2 or more.

As for a hydrolysate and/or condensate of such metal compound, it is preferred to be hydrolyzed by using 0.5 mol or more of water with respect to 1 mol of metal compound having 2 or more hydroxyl groups or hydrolysable groups, and more preferred to be hydrolyzed by using 0.5 to 2 mol of water.

Further, as for a hydrolysate and/or condensate of a metal chelate compound, it is preferred to be hydrolyzed by using 5 to 100 mol of water with respect to 1 mol of metal chelate compound, and more preferred to be hydrolyzed by using 5 to 20 mol of water.

Furthermore, as for a hydrolysate and/or condensate of a metal organic acid salt compound, it is preferred to be hydrolyzed by using 5 to 100 mol of water with respect to 1 mol of metal organic acid salt compound, and more preferred to be hydrolyzed by using 5 to 20 mol of water.

Further, as for metals in the metal compounds, metal chelate compounds or metal organic acid salt compounds, examples include titanium, zirconium, aluminum, silicon, germanium, indium, tin, tantalum, zinc, tangsten and lead. Among these, titanium, zirconium and aluminum are preferred, and titanium is particularly preferred.

In the present invention, when using 2 or more kinds of silanol condensation catalyst, it may comprise a compound with photosensitivity mentioned in the above, or may not comprise a compound with photosensitivity. Further, a compound having photosensitivity and a compound not having photosensitivity may used in combination.

(Method for Preparing a Composition for Forming a Hard Coat Layer)

The method for preparing a composition for forming a hard coat layer of the present invention comprises adding water and a solvent according to need, and mixing organosilicon compound, ultra violet ray-curable compound and silanol condensation catalyst.

Specifically, known conditions and methods may be employed, and for example, it may be prepared according to the method described in, for example, WO2008/69217.

The solvent to be used is not particularly limited, and examples include: aromatic hydrocarbons such as benzene, toluene and xylene; aliphatic hydrocarbons such as hexane and octane; alicyclic hydrocarbons such as cyclohexane and cyclopentane; ketones such as acetone, methylethylketone and cyclohexanone; ethers such as tetrahydrofuran and dioxane; esters such as ethyl acetate and butyl acetate; amides such as N,N-dimethylformamide and N,N-dimethylacetoamide; sulfoxides such as dimethylsulfoxide; alcohols such as methanol, ethanol, propanol and butanol; polyalcohol derivatives such as ethylene glycol monomethylether and ethylene glycol monomethylether acetate. These solvents may be used alone, or by combining 2 or more kinds.

When combining 2 or more kinds, the combination of butanol/ethyl acetate/ethanol can be preferably exemplified.

The solid content of the composition for forming a hard coat layer of the present invention (organosilicon component, ultraviolet ray-curable compound, silanol condensation catalyst and photopolymerization initiator, etc.) is preferably 1 to 75 mass, and more preferably 10 to 60 mass %. The ultraviolet ray-curable compound is not particularly limited with respect to the total mass of solid content of organosilicon compound and/or its condensate, silanol condensation catalyst, ultraviolet ray-curable compound and photopolymerization initiator, etc., and it is preferably 80% or less, and more preferably 10 to 70%.

When a photosensitive compound is contained as a silanol condensation catalyst, the content of the photosensitive compound depends on its type, however the metal atom in the photosensitive compound is generally 0.01 to 0.5 molar equivalent, preferably 0.05 to 0.2 molar equivalent, with respect to Si in the organosilicon compound.

Further, tetrafunctional silane or colloidal silica can be added to the composition in order to enhance hardness of the obtained hard coat layer. Examples of tetrafuntioncal silane include: tetraaminosilane, tetrachlorosilane, tetraacetoxysilane, tetramethoxysilane, tetraethoxysilane, tetrabutoxysilane, tetrabenzyloxysilane, tetraphenoxysilane, tetra(meth)acryloxysilane, tetrakis [2-(meth)acryloxyethoxy]silane, tetrakis(2-vinyloxyethoxy)silane, tetraglycidyloxysilane, tetrakis(2-vinyloxybutoxy)silane and tetrakis(3-methyl-3-oxetanemethoxy)silane. Further, as colloidal silica, water-dispersible colloidal silica and colloidal silica wherein organic solvents such as methanol and isopropylalcohol are dispersed can be exemplified.

2. Molding Sheet for Forming a Hard Coat Layer

The molding sheet of the present invention is a sheet for forming a hard coat layer, and comprises a hard coat precursor layer comprising a semi-cured material of the above mentioned composition for forming a hard coat layer.

The semi-cured material of the composition for forming a hard coat layer means a compound wherein the organosilicon compound and/or ultraviolet ray-curable compound in the composition is partially condensed. A condensate is mainly a condensate of an organosilicon compound.

The molding sheet for forming a hard coat layer of the present invention may be a sheet to be attached integrally with the substrate of the sheet on the molded body, or it may be a transfer foil. As a sheet to be attached integrally with the substrate of the sheet on the molded body, a sheet for in-mold lamination can be preferably exemplified.

1) Transfer Foil

A transfer foil is laminated with a hard coat precursor layer consisted of a semi-cured material of the composition for forming a hard coat layer on one side of the substrate. Further, according to need, a detaching layer, release layer and primer layer, or a decoration layer such as picture layer and metal deposition layer and/or adhesion layer may be laminated, and it is preferred to have an adhesion layer.

As for a substrate for a transfer foil, various materials can be applied as long as it has heat resistance, mechanical strength, solvent resistance, etc. Examples include polyester series resins such as polyethylene terephthalate and polyethylene naphthalate; polyamide series resins such as nylon 6; polyolephin series resins such as polyethylene, polypropylene and polymethylpentene; vinyl series resins such as polyvinyl chloride; acryl series resins such as polymethacrylate and polymethyl methacrylate; styrene series resins such as polycarbonate and high-impact polystyrene; cellulose film such as cellophane and cellulose acetate; and imide series resins such as polyimide. From the view point of heat resistance and mechanical strength, preferred is a polyester series resin film such as polyethylene terephthalate, polybutylene terephthalate and polyethylene naphthalate, and polyethylene terenaphthalate is most suitable. A thickness of the substrate of about 10 to 100 µm is usually applied, and it is preferably 20 to 50 µM.

The substrate may be a copolymer resin comprising these resins as main components, or may be a laminated body consisted of a mixed body (including alloy) or plural layers. Further, the substrate may be a stretched film or a non-stretched film, while a film stretched to unaxial direction or biaxial direction is preferred for the purpose of improving strength. The substrate is used as a film, sheet or board consisting of at least one layer of these resins. A highly adhesive treatment such as corona discharge treatment, plasma treatment, ozone treatment, frame treatment, primer (anchor coat, adhesive promoter, also called as high adhesive) coating treatment, pre-heating treatment, dust exclusion treatment, deposition treatment and alkali treatment may be performed to the coating surface before the coating. Further, according to need, additives such as filler, plasticizer, colorant and antistat may be added.

(Adhesion Layer)

In case of a transfer layer, it is preferred to form an organic resin adhesion layer on the hard coat layer in a semi-cured state, in order to simplify transfer, and to tightly attach the hard coat layer to the substrate after transfer. Examples of adhesion layer include acrylic resins, acrylurethane resins, acryl vinyl acetate resins, acryl styrene resins, vinyl acetate resins, polyolephin resins and vinyl chloride resins. So that the transfer foil does not block after wounding it, the glass transition temperature of the resin to be used is preferred to be room temperature or higher.

Further, it is preferred that an aqueous organic resin, is used as a material, coated and dried to form an organic resin adhesion layer on a hard coat layer in a semi-cured state. "Aqueous" relates to an organic resin solution comprising water as a main solvent, and examples include acryl emulsion, acryl/urethane emulsion, acryl/vinyl acetate copolymeric emulsion, acryl/styrene copolymeric emulsion, vinyl acetate copolymeric emulsion, ethylene copolymeric emulsion, aqueous polyolephin synthetic resin, aqueous urethane resin and vinyl chloride synthetic resin.

Specifically, as commercial products, the followings can be exemplified.

Nichigo-Mowiniyl Co. Ltd.; Product name: Mowinyl7980, 972, 760H, 081F, 082, 109E, 172E, 180E, 206, DC, 502N;

DIC Corporation; Product name: SF primer-W-123K, W-125A, W-200A, HYDRAN ADS-110, ADS-120, HW-311, HW-333, AP-20, APX-101H, AP-60LM;

Unitika Ltd.; Product name: ARROWBASE SA-1200, SB-1200, SE-1200, SB-1010;

Nichiei Kakoh Co., Ltd.; Product name: LIFEBOND VP-90, HC-12, HC-17, HC-38.

(Detaching Layer and Release Layer)

As a detaching layer and release layer, releasable resin, resin comprising releasing agent, and curable resin cross-linking by ionizing radiation, etc. can be applied. Examples of releasable resin include fluorinated resin, silicone series resin, melamine series resin, epoxy resin, polyester resin, acrylic resin and cellulose series resin. Examples of resin comprising releasing agent include fluorine series resin, silicone series resin, acrylic resin added or copolymerized with releasing agent such as various waxes, vinyl series resin, polyester resin and cellulose series resin.

Formation of detaching layer and release layer may be performed by dispersing or diluting the resin to the solvent, coating with a known coating method such as roll coating and gravure coating, and drying. Alternatively, it may be dried by heating at a temperature of 30 to 120° C., or by crosslinking by aging or irradiating active energy ray. The thickness of detaching layer and release layer is usually approximately 0.1 µm to 20 µm, preferably approximately 0.5 µm to 10 µm, respectively.

A transfer foil may be attached with any picture layer and/or metal deposition layer, other than the above layers.

The thickness of a hard coat precursor layer on the substrate depends on its use, while it is preferred that the thickness of a hard coat precursor layer before transfer is 0.5 to 20 µm, particularly approximately 1 to 10 µm.

As long as it does not impair properties and functions of each layer, various additives, such as antistat, water repellent, oil repellent, stabilizer, conductor and antifog agent can be added to each layer according to need.

2) Molding Sheet Wherein the Substrate Sheet and Hard Coat Layer are Integrated after Molding Examples of molding sheet wherein the substrate sheet and hard coat layer are integrated after molding include sheet for press molding, sheet for vacuum molding, sheet for compressed-air molding, sheet for mat molding, sheet for emboss molding and sheet for in-mold lamination. To these sheets, a hard coat precursor layer consisted of a semi-cured material of the composition for forming a hard coat layer is laminated on one side of the substrate. Further, according to need, decoration layers such as picture layer and metal deposition layer may be laminated on the side opposite to the hard coat layer, and a primer layer may be provided between the sheet and the hard coat layer.

Examples of substrates are the same as those exemplified for the substrates of transfer foil, and are selected appropriately depending on the use of the molded product and the desired appearance or the like. Preferably, from the view points of moldability, heat resistance and mechanical strength, it is an acrylic resin, polyester series resin, and polycarbonate. A thickness of the substrate of about 10 to 5000 μm is usually applied, and it is preferably 100 to 2000 μm.

The thickness of the hard coat precursor layer on the substrate depends on its use, while it is preferred to be 0.5 mm to 20 μm, particularly 1 to 10 μm.

As long as it does not impair properties and functions of each layer, various additives, such as antistat, water repellent, oil repellent, stabilizer, conductor and antifog agent can be added to each layer according to need.

3) Method for Manufacturing a Molding Sheet for Forming a Hard Coat Layer

The manufacture of a sheet of the present invention may be performed by laminating each layer on the substrate, and various known laminating methods can be used. For example, each layer can be formed by methods including microgravure coating, comma coating, barcoater coating, air knife coating, offset printing, flexo printing, screen printing and spray coating.

The hard coat precursor layer is formed on the substrate by coating a solution comprising a composition for forming a hard coat layer on the substrate, and semi-curing it by heating and/or irradiating active energy ray. By this step, condensates of organosilicon compounds in the composition for forming a hard coat layer are crosslinked, and the hard coat layer is semi-cured. When an organic solvent is used as a diluent solvent, etc., the organic solvent is removed by this heating. Heating is generally performed at 40 to 200° C., preferably 50 to 150° C. Heating time is generally 10 seconds to 30 minutes, preferably 30 seconds to 5 minutes.

4) Method for Using a Molding Sheet for Forming a Hard Coat Layer

The molding sheet of the present invention may be used under known conditions and with known methods. For example, in case of a transfer foil, transfer is performed by tightly attaching the transfer foil to the adherend.

The material of the adherend is not limited, and examples include resin molded products, woodcrafts, and complex products thereof. These may be transparent, translucent, or opaque. Further, the adherend may be colored or not colored. Examples of resin include general-purpose resins including polystyrene series resin, polyolephin series resin, ABS resin and AS resin. Moreover, general-purpose engineering resins including polyphenylene oxide/polystyrene series resin, polycarbonate series resin, polyacetalic resin, acrylic resin, polycarbonate denatured-polyphenylene ether resin, polyethylene terephtalate resin, polybutylene terephtalate resin and super-high-molecular polyethylene resin; super engineering resins including polysulfone resin, polyphenylene sulfide series resin, polyphenylene oxide series resin, polyacrylate resin, polyether imide resin, polyimide resin, liquid-crystal polyester resin and polyaryl series heat resistant resin. Further, complex resin added with strengthening agent such as glass fiber and inorganic fiber can be used.

As a method for forming a hard coat layer on the adherend surface, examples include a method comprising adhering a transfer foil on the adherend surface, then transferring the transfer foil onto the adherend surface by detaching the substrate of the transfer foil, and curing it by active energy irradiation and optionally by heating (transfer method); and a method comprising clipping the transfer foil in the mold tool, injecting and filling resin in the cavity, adhering the transfer foil to the surface of the obtained resin molded product at the same time as it is obtained, detaching the substrate to transfer it on the molded product, and curing by active energy ray irradiation, and optionally by heating (in-mold method).

The method for forming a hard coat layer of the molded product by in-mold transfer method is specifically explained. First, the transfer foil is sent into the mold for molding consisted of a movable mold and fixed mold, so that the hard coat precursor layer is in the inner side, specifically, so that the substrate is in contact with the fixed mold. At this time, the transfer foil sheets may be sent one by one, or the necessary part of the long transfer foil may be sent intermittently. After closing the mold for molding, molten resin is injected and filled in the mold from the gate provided on the movable mold, and the transfer foil is adhered to the surface at the same time as the molded product is formed. After cooling the resin molded product, the resin molded product is ejected by opening the mold for molding. Finally, after detaching the substrate, the hard coat precursor layer is completely cured by active energy ray irradiation, and optionally by heating.

As for the step of transferring and curing the hard coat precursor layer, as it is shown in the above method, it is preferred that the steps are in the order of adhering the transfer foil to the adherend surface, and then detaching the substrate to transfer on the molded product surface, and subsequently performing active energy ray irradiation, and optionally heating. However, it may be performed in the order of, adhering the transfer foil to the adherend surface, curing completely the hard coat precursor layer by active energy ray irradiation and optionally heating from the substrate side, and then detaching the substrate.

As for active energy ray, ultraviolet ray, X ray, radioactive ray, ionized radioactive ray and ionizing radioactive ray (α-, β-, γ-ray, neutron ray, electron ray) can be used, and a light having a wavelength of 350 nm or less is preferred.

Irradiation of active energy ray can be performed by using known devices including extra high pressure mercury lamp, high pressure mercury lamp, low pressure mercury lamp, metal halide lamp, excimer lamp, carbon arc lamp and xenone arc lamp. As a light source of irradiation, a light source comprising light having any wavelength of 150 to 350 nm is preferred, and a light source comprising light having any wavelength of 250 to 310 nm is more preferred.

Further, irradiation light volume of light to irradiate in order to sufficiently cure the hard coat layer in a semi-cured state, for example a volume of approximately 0.1 to 100 J/cm$^2$ can be exemplified. In view of the film curing efficiency (relationship of irradiated energy and film curing level), the light volume is preferably approximately 1 to 10 J/cm$^2$, and more preferably approximately 1 to 5 J/cm$^2$.

When the molding sheet is a sheet to be attached integrally with the sheet substrate on the molded body, known molding and processing method and/or method for processing surface configuration can be used as a molding method.

For example, compression molding, transfer molding, lamination molding, calendar molding, insert molding, injection molding, extrusion molding, press molding, mat molding, blow molding, free blow molding, vacuum molding, vacuum and compressed-air molding, compressed-air molding, matched mold molding, insert molding, emboss molding, bending process, frosting process, Shibo process, etc. can be used. Press molding, vacuum molding, vacuum and compressed-air molding, mat molding and emboss molding are preferred. Meanwhile, a method comprising molding by heating is preferred.

For example, the method for molding by vacuum molding is specifically explained. First, the molding sheet of the present invention is clipped between the cramps and the upper and lower sides are heated with a heater. After heating for a prescribed period, the heater is taken off so that the substrate is adjacent to the mold. The mold comprises small holes or slits. When the substrate and mold are adjacent, the space between the substrate and mold is deaerated from the small holes or slits, and molded by letting the substrate to be tightly fit to the mold. After molding, the pressure is set back to the ordinary pressure, the mold is taken off to obtain the molded product. The heating temperature may be changed depending on the substrate material, and heating can be conducted at for example 120° C. to 250° C., and the mold temperature may be 50° C. to 150° C.

After obtaining the molded product attached with the molding sheet of the present invention by the above molding, active energy ray is irradiated to the molded product, to cure completely the hard coat precursor layer and to obtain a hard coat layer. By irradiating active energy ray, the hard coat layer is completely cured. For example, by irradiating ultraviolet ray, the ultraviolet ray-curable compound is cured. Further, when a photosensitive compound is contained, the photosensitive compound responds to a light having a wavelength of 350 nm or less, and a surface mineralization occurs.

For the irradiation of active energy ray, devices and conditions similar to those exemplified for the transfer foil can be applied.

The hard coat layer formed by the molding sheet of the present invention has preferably a constitution wherein the carbon content of the surface part is less than the carbon content of the back side part, and it is more preferred that the carbon content of the surface part at 2 nm in the depth direction from the surface is 80% or less with respect to the carbon content on the back side part at 10 nm in the depth direction from the back side, and more preferably 2 to 60%. Herein, the carbon content of the surface side being less than is the carbon content of the back side part means that the total carbon amount from the surface to the central part is less than the total carbon amount from the back side to the central part.

EXAMPLES

In the following, the present invention will be explained further in detail by referring to the Examples, while the technical scope of the present invention will be not limited to these.

1. Example of Transfer Foil

Example 1

(Preparation of Composition for Forming a Hard Coat Layer)

303.03 g of titanium diisopropoxybisacetylacetonate (Nippon Soda Co., Ltd.; T-50; Solid content in terms of titanium oxide: 16.5 mass %) was dissolved into 584.21 g of a mixed solvent of ethanol/ethyl acetate/2-butanol (=60/20/20: mass %). 112.76 g of ion-exchange water (10-fold mol/mols of titanium oxide) was slowly dropped by stirring to allow hydrolysis. 1 day after, the solution was filtered, and a yellow and transparent nanodispersed solution of titanium oxide [A-1] with a concentration of 5 mass % in terms of titanium oxide was obtained. The average particle diameter of titanium oxide was 4.1 nm, and the titanium oxide was monodispersible.

As organosilicon compound, a solution [C-1] wherein 264.76 g of vinyltrimethoxysilane [B-1] (Shin-Etsu Chemical Co., Ltd.; KBM-1003) was mixed with 190.19 g of 3-methacryloxypropyltrimethoxysilane [B-2] (Shin-Etsu Chemical Co., Ltd.; KBM-503) (vinyltrimethoxysilane/3-methacryloxypropyltrimethoxys ilane=70/30: molar ratio) was used.

453.09 g of the above [A-1] and 454.95 g of [C-1] were mixed so that the element ratio becomes (Ti/Si=1/9), and subsequently 91.96 g of ion-exchange water (2-fold mol/mols of organosilicon compound) was slowly dropped and stirred for 12 hours, to prepare the solution [D-1].

As ultraviolet ray-curable compound, urethane acrylate oligomer (The Nippon Synthetic Chemical Industry Co., Ltd.; ultraviolet UV7600B) was dissolved into a mixed solvent of ethanol/ethyl acetate/2-butanol (=60/20/20: mass %) so that it becomes 40 mass %. To this resultant solution, 2-hydroxy-2-methyl-1-phenyl-propan-1-one (Ciba Specialty Chemicals; Darocure 1173) was dissolved as a photopolymerization initiator so that it becomes 4 mass % with respect to the solid content of urethane acrylate oligomer, to prepare the solution [E-1].

The above solutions [D-1] and [E-1] were mixed so that the solid content ratio becomes 70 mass %/30 mass %=[D-1]/[E-1], to prepare the composition solution for forming a hard coat layer [F-1].

(Preparation of Transfer Foil)

A film was formed with the obtained composition solution for forming a hard coat layer [F-1] with the use of barcoater on a release film (TOYOBO, TN100), dried at 100° C. for 10 minutes with a hot air recycling drier, to make a semi-cured state, and a transfer foil was obtained.

Example 2

(Preparation of Composition for Forming a Hard Coat Layer)

303.03 g of titanium diisopropoxybisacetylacetonate (Nippon Soda Co., Ltd.; T-50; Solid content in terms of titanium oxide: 16.5 mass %) was dissolved into 584.21 of a mixed solvent of ethanol/ethyl acetate/2-butanol (=60/20/20: mass %). 112.76 g of ion-exchange water (10-fold mol/mols of titanium oxide) was slowly dropped by stirring to allow hydrolysis. 1 day after, the solution was filtered, and a yellow and transparent nanodispersed solution of titanium oxide [A-1] with a concentration of 5 mass % in terms of titanium oxide was obtained. The average particle diameter of titanium oxide was 4.1 nm, and the titanium oxide was monodispersible.

As organosilicon compound, a solution [C-2] wherein 210.00 g of vinyltrimethoxysilane [B-1] (Shin-Etsu Chemical Co., Ltd.; KBM-1003) is mixed with 144.22. g of 3-glycidoxypropyltrimethoxysilane [B-3] (Shin-Etsu Chemical Co., Ltd.; KBM-403) (vinyltrimethoxysilane/3-glycidoxypropyltrimethoxysilane=70/30:molar ratio) was used.

358.62 g of the above [A-1] and 354.22 g of [C-2] were mixed so that the element ratio becomes (Ti/Si=1/9), and stirred for 12 hours to prepare the solution [D-2].

As ultraviolet ray-curable compound, urethane acrylate oligomer (The Nippon Synthetic Chemical Industry Co., Ltd.; ultraviolet UV7600B) was dissolved into a mixed solvent of ethanol/ethyl acetate/2-butanol (=60/20/20:mass %) so that it becomes 40 mass %. To this resultant solution, 2-hydroxy-2-methyl-1-phenyl-propan-1-one (Ciba Specialty Chemicals; Darocure 1173) was dissolved as a photopolymerization initiator so that it becomes 4 mass % with respect to the solid content of urethane acrylate oligomer, to prepare the solution [E-1].

The above solutions [D-2] and [E-1] were mixed so that the solid content ratio becomes 70 mass %/30 mass %=[D-2]/[E-1], to prepare the composition solution for forming a hard coat layer [F-2].
(Preparation of Transfer Foil)

A film was formed with the obtained composition solution for forming a hard coat layer [F-2] with the use of barcoater on a release film (TOYOBO, TN100), dried at 100° C. for 10 minutes with a hot air recycling drier, to make a semi-cured state, and a transfer foil was obtained.

Example 3

(Preparation of Adhesion Layer Solution)

Acryl emulsion 7980 (Nichigo Mowinyl) [G-1] was water diluted to a solid concentration of 20 wt %. Similarly, vinyl acetate/acryl emulsion 760H (Nichigo Mowinyl) [G-2] was diluted to a solid concentration of 20 wt %. The 2 solutions were mixed and stirred so that the solid content ratio becomes 10 mass %/90 mass %=[G-1]/[G-2], to prepare an aqueous adhesion layer solution [H-1].
(Preparation of Transfer Foil)

A film was formed with the composition solution for forming a hard coat layer [F-1] with the use of barcoater on a PET film for release (melamine release layer treatment), dried at 150° C. for 30 seconds with a hot air recycling drier. Further, a film was formed with the adhesion layer solution [H-1] with a barcoater on the hard coat layer in a semi-cured state, dried at 150° C. for 30 seconds, and a transfer foil having an adhesion layer was obtained.

Example 4

(Preparation of Adhesion Layer Solution)

Acryl emulsion 7980 (Nichigo Mowinyl) [G-1] was water diluted to a solid concentration of 20 wt %. Similarly, styrene/acryl emulsion 972 (Nichigo Mowinyl) [G-3] was diluted to a solid concentration of 20 wt %. The two solutions were mixed and stirred so that the solid content ratio becomes 50 mass %/50 mass %=[G-1]/[G-3], to prepare an aqueous adhesion layer solution [H-2].
(Preparation of Transfer Foil)

By using the adhesion layer solution [H-2], a transfer foil having an adhesion layer was obtained by a similar method as Example 3.
[Evaluation of Transfer Foil]

The following evaluation was made for the transfer foils of Examples 1 and 2.
Remaining Tack Property The coating surface of the transfer foil was touched with fingers, and the presence and absence of remaining tack was evaluated. o was denoted for those with no remaining tack, and x was denoted for those with remaining tack.
Blocking Resistance The coating surface of the transfer foil and polyester resin film were piled, and clipped between 10 cm×10 cm glass plates. A weight of 1 kg was put over the glass plate, and kept at normal temperature for 1 day. Subsequently, the piled films were taken out, to detach films from each other. The presence or absence of phenomenon where the coating surface of the transfer foil is transferred to the other film (blocking) was confirmed by eye observation, and evaluated. ⊚ was denoted for those where blocking was not observed, and can be easily detached, o was denoted for those where blocking was not observed, but a resistance is felt when detaching, and x was denoted for those where blocking occurs.
Bending Resistance Test Bending resistance test was conducted to the transfer foils according to JIS K-5600-5-1.

As a result of evaluating the transfer foils prepared in the above Examples 1 and 2, both transfer foils were evaluated as o for remaining tack, and ⊚ for blocking resistance. The bending resistance was good for both transfer foils, as no cracks were generated even when using a 2 mm-mandrel.
[Formation of Hard Coat Using Transfer Foil]

A hard coat layer was formed on the adherend by the following method, by using the transfer foils of Examples 1 to 4.

Releasing materials were piled on the plastic substrate, heated with a laminator (Inter Cosmos; LAMIGUARD IC-230PRO), pressed, and the transfer foils of Examples 1 to 4 were transferred. A 3 mm-thick polycarbonate sheet (Mitsubishi Engineering-Plastics Corporation; UPIRON NF-2000) was used as an adherend. Ultraviolet ray was irradiated to the adherend where transfer was performed, with an accumulated irradiation level of 2100 mJ/cm$^2$ with a conveyor type light harvesting high pressure mercury light (Eye Graphics, lamp output 120 W/cm, 1 lamp, lamp height 9.8 cm, conveyor rate 8 m/min) to obtain a completely cured hard coat layer.
[Evaluation of Hard Coat Layer]
Pencil Hardness Test Pencil hardness test was conducted to the hard coat layer on the adherend according to JIS K5600-5-4.
Abrasion Resistance Test Abrasive wheels (CS-10F) were mounted to the TABER'S Abrasion Tester (Toyo Tester Industry, Co., Ltd.). A load of 500 g was applied to each abrasive wheel, to perform a 500 rotation-test. Haze ratio change of this test site was set as ΔH, being the evaluation of the abrasion resistance.

As a result of evaluating hard coat layers prepared with the transfer foils of Examples 1 to 4, pencil hardness was F, Haze rate after Taber's abrasion test was 8% for all of them.
2. Examples of Molding Sheet Integrated with the Substrate Example 5

(Preparation of Molding Sheet)

A film was formed with the composition solution for forming a hard coat layer [F-1] with the use of barcoater on a polycarbonate sheet (UPIRON NF-2000, 0.8 mm thickness), dried at 120° C. with a hot air recycling drier, to obtain a sheet having a semi-cured hard coat layer (hard coat precursor layer) without stickiness.
(Preparation of Molded Body Having a Hard Coat Layer)
1) Vacuum Molding A cell phone housing was formed by vacuum molding method. Vacuum molding was performed under conditions of heating temperature of 180° C., mold temperature of 80° C., vacuum level of 40 mm (by mercury column). The appearance of the obtained housing was good.
2) UV Cure Ultraviolet ray with an accumulated ultraviolet ray irradiation level of 2100 mJ/cm$^2$ was irradiated to the vacuum molded housing sample with a light harvesting high pressure mercury light (UV light comprising as a main component light having a wavelength of 365 nm, 313 nm, 254 nm; Eye Graphics, 1 lamp type, 120 W/cm, lamp height 9.8 cm, conveyor rate 8 m/min), to obtain a cured film. The appearance of the obtained film was good.

Example 6

(Preparation of Composition for Forming a Hard Coat Layer)

5.9 g of tris acetyl acetonate aluminum (ACROS ORGANICS) was dissolved in 174.1 g of a mixed solvent of 2-butanol/ethyl acetate/ethanol=20/20/60, to prepare a solution [A-2] having a solid content of 0.5 mass % of solid content in terms of aluminum oxide. As a mixed solution of organosilicon compound [C-1], (vinyltrimethoxysilane/3-methacryloxypropyltrimethoxysilane=70/30: molar ratio) was used.

51.5 g of the above [A-2] and 44.8 g of [C-1] were mixed so that the element ratio becomes (Al/Si=1/99), and 13.1 g of ion-exchange water (3-fold mol/mols of silicon compound) was dropped slowly, and stirred 12 hours to prepare the solution [D-3].

The above solutions [D-3] and [E-1] were mixed so that the solid content ratio becomes 70 mass %/30 mass %=[D-3]/[E-1], to prepare the composition solution for forming a hard coat layer [F-3].

(Preparation of Molding Sheet)

A film was formed with a solution for forming a hard coat layer [F-3] with the use of a barcoater on a polycarbonate sheet (UPIRON NF-2000, 0.8 mm thickness), dried at 120° C. with a hot air recycling drier, to obtain a sheet having a semi-cured hard coat layer (hard coat precursor layer) without stickiness.

Example 7

(Preparation of Composition for Forming a Hard Coat Layer)

14.6 g of an aqueous hydrochloric acid solution (0.37 mol/L) was mixed with 42.4 g of a mixed solvent of 2-butanol/ethyl acetate/ethanol=20/20/60 to prepare the solution [A-3]. As a mixed solution of organosilicon compound, [C-1] (vinyltrimethoxysilane/3-methacryloxypropyltrimethoxysilane=70/30: molar ratio) was used.

57.0 g of the above [A-3] and 48.2 g of [C-1] were mixed, and stirred for 12 hours to obtain the solution [D-4].

The above solutions [D-4] and [E-1] were mixed so that the solid content ratio becomes 70 mass %/30 mass %=[D-4]/[E-1], to prepare the composition solution for forming a hard coat layer [F-4].

(Preparation of Molding Sheet)

A film was formed with the composition solution for forming a hard coat layer [F-4] in a similar manner to Examples 5 and 6, to obtain a sheet having a semi-cured hard coat layer (hard coat precursor layer) without stickiness.

Example 8

(Preparation of Composition for Forming a Hard Coat Layer)

14.6 g of an aqueous hydrochloric acid solution (0.073 mol/L) was mixed with 42.4 g of a mixed solvent of 2-butanol/ethyl acetate/ethanol=20/20/60 to prepare the solution [A-4]. As a mixed solution of organosilicon compound, [C-1] (vinyltrimethoxysilane/3-methacryloxypropyltrimethoxysilane=70/30: molar ratio) was used.

57.0 g of the above [A-4] and 48.2 g of [C-1] were mixed, and stirred for 12 hours to obtain the solution [D-5].

The above solutions [D-5] and [E-1] were mixed so that the solid content ratio becomes 70 mass %/30 mass %=[D-5]/[E-1], to prepare the composition solution for forming a hard coat layer [F-5].

(Preparation of Molding Sheet)

A film was formed with the composition solution for forming a hard coat layer [F-5] in a similar manner to Examples 5 and 6, to obtain a sheet having a semi-cured hard coat layer (hard coat precursor layer) without stickiness.

Example 9

(Preparation of Composition for Forming a Hard Coat Layer)

14.6 g of an aqueous acetic acid solution (0.37 mol/L) was mixed with 42.4 g of a mixed solvent of 2-butanol/ethyl acetate/ethanol=20/20/60 to prepare the solution [A-5]. As a mixed solution of organosilicon compound, [C-1] (vinyltrimethoxysilane/3-methacryloxypropyltrimethoxysilane=70/30: molar ratio) was used.

57.0 g of the above [A-5] and 48.2 g of [C-1] were mixed, and stirred for 12 hours to obtain the solution [D-6].

The above solutions [D-6] and [E-1] were mixed so that the solid content ratio becomes 70 mass %/30 mass %=[D-6]/[E-1], to prepare the composition solution for forming a hard coat layer [F-6].

(Preparation of Molding Sheet)

A film was formed with the composition solution for forming a hard coat layer [F-6] in a similar manner to Examples 5 and 6, to obtain a sheet having a semi-cured hard coat layer (hard coat precursor layer) without stickiness.

Example 10

(Preparation of Composition for Forming a Hard Coat Layer)

14.6 g of an aqueous acetic acid solution (0.073 mol/L) was mixed with 42.4 g of a mixed solvent of 2-butanol/ethyl acetate/ethanol=20/20/60 to prepare the solution [A-6]. As a mixed solution of organosilicon compound, [C-1] (vinyltrimethoxysilane/3-methacryloxypropyltrimethoxysilane=70/30: molar ratio) was used.

57.0 g of the above [A-6] and 48.2 g of [C-1] were mixed, and stirred for 12 hours to obtain the solution [D-7].

The above solutions [D-7] and [E-1] were mixed so that the solid content ratio becomes 70 mass %/30 mass %=[D-7]/[E-1], to prepare the composition solution for forming a hard coat layer [F-7].

(Preparation of Molding Sheet)

A film was formed with the composition solution for forming a hard coat layer [F-7] in a similar manner to Examples 5 and 6, to obtain a sheet having a semi-cured hard coat layer (hard coat precursor layer) without stickiness.

Example 11

(Preparation of Composition for Forming a Hard Coat Layer)

To a mixed solution of 42.4 g of a mixed solvent of 2-butanol/ethyl acetate/ethanol=20/20/60 and 14.6 g of ion-exchange water, 0.37 g of acid phtalic anhydride was added by stirring to prepare the solution [A-7]. As a mixed solution of organosilicon compound, [C-1] (vinyltrimethoxysilane/3-methacryloxypropyltrimethoxys ilane=70/30: molar ratio) was used.

57.8 g of the above [A-7] and 48.2 g of [C-1] were mixed, and stirred for 12 hours to obtain the solution [D-8].

The above solutions [D-8] and [E-1] were mixed so that the solid content ratio becomes 70 mass %/30 mass %=[D-8]/[E-1], to prepare the composition solution for forming a hard coat layer [F-8].
(Preparation of Molding Sheet)
A film was formed with the composition solution for forming a hard coat layer [F-8] in a similar manner to Examples 5 and 6, to obtain a sheet having a semi-cured hard coat layer (hard coat precursor layer) without stickiness.

Example 12

(Preparation of Composition for Forming a Hard Coat Layer)
To a mixed solution of 42.4 g of a mixed solvent of 2-butanol/ethyl acetate/ethanol=20/20/60 and 14.6 g of ion-exchange water, 0.15 g of acid phtalic anhydride was added by stirring to prepare the solution [A-8]. As a mixed solution of organosilicon compound, [C-1] (vinyltrimethoxysilane/3-methacryloxypropyltrimethoxysilane=70/30: molar ratio) was used.
57.8 g of the above [A-8] and 48.2 g of [C-1] were mixed, and stirred for 12 hours to obtain the solution [D-9].
The above solutions [D-9] and [E-1] were mixed so that the solid content ratio becomes 70 mass %/30 mass %=[D-9]/[E-1], to prepare the composition solution for forming a hard coat layer [F-9].
(Preparation of Molding Sheet)
A film was formed with the composition solution for forming a hard coat layer [F-9] in a similar manner to Examples 5 and 6, to obtain a sheet having a semi-cured hard coat layer (hard coat precursor layer) without stickiness.

Example 13

(Preparation of Composition for Forming a Hard Coat Layer)
As an organosilicon compound, a solution [C-3] wherein 45.0 g of methyltrimethoxysilane (Shin-Etsu Chemical Co., Ltd.; KBM-13) [B-4] and 35.4 g of 3-methacrlyoxypropyltrimethoxysilane (Shin-Etsu Chemical Co., Ltd.; KBM-503) [B-2] were mixed in a ratio of (methyltrimethoxysilane/3-methacryloxypropyltrimethoxysilane=70/30: molar ratio) was used.
83.6 g of titanium dispersed solution [A-1] and 80.4 g of [C-3] were mixed so that the element ratio becomes (Ti/Si=1/9), and 16.0 g of ion-exchange water (2-fold mol/mols of organosilicon compound) was dropped slowly and stirred for 12 hours to prepare the solution [D-10].
The above solutions [D-10] and [E-1] were mixed so that the solid content ratio becomes 70 mass %/30 mass %=[D-10]/[E-1], to prepare the composition solution for forming a hard coat layer [F-10].
(Preparation of Molding Sheet)
A film was formed with the composition solution for forming a hard coat layer [F-10] in a similar manner to Examples 5 and 6, to obtain a sheet having a semi-cured hard coat layer (hard coat precursor layer) without stickiness.

Example 14

(Preparation of Composition for Forming a Hard Coat Layer)
As an organosilicon compound, a solution [C-4] wherein 50.0 g of methyltrimethoxysilane (Shin-Etsu Chemical Co., Ltd.; KBM-13) [B-4] and 37.4 g of γ-glycidoxypropyltrimethoxysilane (Shin-Etsu Chemical Co., Ltd.; KBM-403) [B-3] were mixed (methyltrimethoxysilane/γ-glycidoxypropyltrimethoxysilane=70/30: molar ratio) was used.
92.9 g of titanium dispersed solution (A-1) and 87.4 g of [C-4] were mixed so that the element ratio becomes (Ti/Si=1/9) and stirred for 12 hours to prepare the solution [D-11].
The above solutions [D-11] and [E-1] were mixed so that the solid content ratio becomes 70 mass %/30 mass %=[D-11]/[E-1], to prepare the composition solution for forming a hard coat layer [F-11].
(Preparation of Molding Sheet)
A film was formed with the composition solution for forming a hard coat layer [F-11] in a similar manner to Examples 5 and 6, to obtain a sheet having a semi-cured hard coat layer (hard coat precursor layer) without stickiness.
[Evaluation of Molding Sheet]
1. Evaluation of Blocking Resistance
The semi-cured hard coat layer (hard coat precursor layer) surface of the molding sheet and a polyester resin film were piled, and clipped between 10 cm×10 cm glass plates. A weight of 1 kg was put over the glass plate, and kept at normal temperature for 1 day. Subsequently, the piled films were taken out, to detach films from each other. The presence or absence of phenomenon where the semi-cured hard coat layer (hard coat precursor layer) surface is transferred to the other film (blocking) was confirmed visually.
No blocking was observed for the molded bodies having a semi-cured hard coat layer (hard coat precursor layer) of Examples 5 to 14.
2. Bending Whitening Test
The semi-cured hard coat layer was put on the outer side, and bent to 45 degree. The presence or absence of cracks on the corner that has been bent was confirmed visually, and the presence or absence of cracks was confirmed.
No crack was observed to the molded body having a semi-cured hard coat layer (hard coat precursor layer) of Examples 5 to 14.
1. Pencil Hardness Test
Pencil hardness was conducted according to JIS K5600-5-4 in a similar manner to the transfer foil.
The pencil hardness of the hard coat of the molded body in Example 5 was H.
2. Adhesion Test
Adhesion test was conducted according to JIS K5600. Cuts were made to the coating film with an interval of 1 mm, and 100 grids were made. Scotch tape (registered trademark) was posted to each sample (film after being cured with ultraviolet ray), and adhered by rubbing more than once with finger pads. Subsequently, the tape was detached. The adhesion was evaluated with the remaining number of lattice where the coating film was not detached.
Adhesion of the hard coat of the molded body of Example 5 had a score of 100, without detaching at all.
3. Abrasion Resistance Test
Similarly as for transfer foil, abrasion resistance test was conducted with TABER'S Abrasion Tester.
ΔH of the hard coat of the molded body of Example 5 was 8, showing a good hard coat property.

INDUSTRIAL APPLICABILITY

The molding sheet for forming a hard coat layer of the present invention is excellent for the remaining tack properties and blocking resistance, thus has an excellent shelf life. The hard coat after transfer has a very high hardness, and thus an excellent abrasion resistance. When a photosensitive compound is contained, the surface is mineralized, and the abrasion resistance is further superior.

The invention claimed is:

1. A molding sheet comprising a semi-cured material of a composition comprising
   a) an organosilicon compound represented by formula (I) and/or its condensate $$R_nSiX_{4-n} \quad (I),$$

wherein R represents an organic group in which a carbon atom is directly bound to Si in the formula, and X represents a hydroxyl group or hydrolysable group; n represents 1 or 2; and when n is 2, R may be the same or different, and when (4−n) is 2 or more, X may be the same or different,
   b) a ultraviolet ray curable-compound,
   c) a silanol condensation catalyst, and
   d) a photopolymerization initiator, on a substrate,
      wherein the organosilicon compound represented by formula (I) and/or its condensate which carbon number of R is 3 or less is 30 to 95 mol % with respect to the compound represented by formula (I) and/or its condensate, and which carbon number of R is 4 or more is 5 to 70 mol % with respect to the compound represented by formula (I) and or its condensate,
      wherein the semi-cured material has no tack properties, and is cured so that no crack is generated by following the mold when molding.

2. The molding sheet according to claim 1, wherein the ultraviolet ray-curable compound is 80 mass % or less with respect to the total mass of the solid content of the composition.

3. The molding sheet according to claim 1, which is a sheet for in-mold lamination.

4. The molding sheet according to claim 1, which is suitable for use as a transfer foil.

5. The transfer foil according to claim 4, further comprising an adhesion layer.

6. The transfer foil according to claim 5, wherein the adhesion layer is prepared from an aqueous organic resin as raw material.

7. The transfer foil according to claim 4, wherein the transfer foil is a transfer foil for in-mold molding.

* * * * *